US012438317B2

(12) United States Patent
Hsu

(10) Patent No.: US 12,438,317 B2
(45) Date of Patent: Oct. 7, 2025

(54) POWER INPUT DEVICE AND POWER MODULE

(71) Applicant: POWERTECH INDUSTRIAL CO., LTD., New Taipei (TW)

(72) Inventor: Jung-Hui Hsu, New Taipei (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 480 days.

(21) Appl. No.: 17/994,473

(22) Filed: Nov. 28, 2022

(65) Prior Publication Data

US 2024/0022033 A1 Jan. 18, 2024

(30) Foreign Application Priority Data

Jul. 14, 2022 (TW) ................................ 111207541

(51) Int. Cl.

*H01R 31/06* (2006.01)
*H01R 13/04* (2006.01)
*H01R 13/447* (2006.01)
*H01R 13/52* (2006.01)
*H01R 103/00* (2006.01)

(52) U.S. Cl.

CPC ............. *H01R 31/06* (2013.01); *H01R 13/04* (2013.01); *H01R 13/447* (2013.01); *H01R 13/5213* (2013.01); *H01R 2103/00* (2013.01)

(58) Field of Classification Search

CPC ...... H01R 31/06; H01R 13/04; H01R 13/447; H01R 13/5213; H01R 2103/00

See application file for complete search history.

(56) References Cited

U.S. PATENT DOCUMENTS 6,126,460 A * 10/2000 Wu ........................ H01R 35/04 439/640
7,001,196 B1 * 2/2006 Huang .................. H01R 35/04 439/131
7,125,266 B1 * 10/2006 Huang .................. H01R 35/04 439/131
7,604,492 B1 * 10/2009 Wang .................... H01R 24/30 439/131
7,798,825 B1 * 9/2010 Pai ........................ H01R 31/06 439/131

(Continued)

*Primary Examiner* — Thanh Tam T Le

(74) *Attorney, Agent, or Firm* — Li & Cai Intellectual Property (USA) Office

(57) ABSTRACT

A power input device and a power module are provided. The power input device includes a plug structure. The plug structure includes a first conductive terminal member, a second conductive terminal member, a first electrical connection member, and a second electrical connection member. The first conductive terminal member includes a first terminal and a first shaft rod. The second conductive terminal member includes a second terminal and a second shaft rod. The first electrical connection member includes a conductive sheet and a first conductive elastic element. Two ends of the first conductive elastic element are respectively connected to the conductive sheet and abutted against the first shaft rod. The second electrical connection member includes a conductive ring and a second conductive elastic element. Two ends of the second conductive elastic element are respectively connected to the second shaft rod and abutted against the conductive ring.

13 Claims, 19 Drawing Sheets

(56) References Cited

U.S. PATENT DOCUMENTS

| | | | | |
|---|---|---|---|---|
| 8,777,644 | B2 * | 7/2014 | Pai | H01R 13/71 439/131 |
| 8,790,124 | B2 * | 7/2014 | Lee | H01R 31/06 439/131 |
| 8,888,513 | B2 * | 11/2014 | Shi | H01R 13/44 439/131 |
| 9,331,441 | B2 * | 5/2016 | Roy | H01R 24/68 |
| 10,992,093 | B1 * | 4/2021 | Lee | H01R 31/06 |
| 11,721,938 | B1 * | 8/2023 | Crunk | H01R 31/06 439/373 |
| 12,224,539 | B2 * | 2/2025 | Liao | H01R 24/68 |
| 12,237,631 | B2 * | 2/2025 | Choi | H01R 31/06 |

* cited by examiner

POWER INPUT DEVICE AND POWER MODULE

CROSS-REFERENCE TO RELATED PATENT APPLICATION

This application claims the benefit of priority to Taiwan Patent Application No. 111207541, filed on Jul. 14, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power input device, and more particularly to a power input device and a power module having a rotary plug structure.

BACKGROUND OF THE DISCLOSURE

In the related art, a power input device can obtain commercial power through a plug. However, the plug in most conventional power input devices in the related art is not capable of being folded, unfolded, and rotated in a same device. Furthermore, even if the plug is capable of being folded, unfolded, and rotated in the same device, the conventional power input devices in the related art cannot consistently maintain an electrical connection through the plug. Moreover, it may be inconvenient to connect the conventional power input devices in the related art to certain adapter plugs having different specifications for different countries.

SUMMARY OF THE DISCLOSURE

In response to the above-referenced technical inadequacies, the present disclosure provides a power input device and a power module.

In one aspect, the present disclosure provides a power input device. The power input device includes a cover structure and a plug structure. The cover structure has a bottom that defines an accommodation space. The plug structure is disposed in the accommodation space of the cover structure. Conductive terminals of the plug structure are capable of being folded and unfolded along a first rotation axis, and capable of being rotated around a second rotation axis. The plug structure includes a first conductive terminal member, a second conductive terminal member, a first electrical connection member, and a second electrical connection member. The first conductive terminal member includes a first terminal and a first shaft rod connected to the first terminal. The second conductive terminal member is spaced apart from the first conductive terminal member. The second conductive terminal member includes a second terminal and a second shaft rod connected to the second terminal. The first terminal and the second terminal are the conductive terminals of the plug structure. The first electrical connection member includes a conductive sheet and a first conductive elastic element. One end of the first conductive elastic element is connected to the conductive sheet, and another end of the first conductive elastic element abuts against the first shaft rod. The second electrical connection member includes a conductive ring and a second conductive elastic element. The conductive ring is disposed to surround the conductive sheet. One end or at least one part of the second conductive elastic element is sleeved on or connected to the second shaft rod, and another end of the second conductive elastic element abuts against the conductive ring and is movable along an annular path.

In another aspect, the present disclosure provides a power module. The power module includes the abovementioned power input device, and an adapter plug. One end of the first terminal away from the first shaft rod has a first through hole, and one end of the second terminal away from the second shaft rod has a second through hole. The adapter plug includes an adapter base and a plurality of adapter terminals disposed on one side surface of the adapter base. Another side surface of the adapter base has an adapter structure. An inner side of the adapter structure has an adapter space. The adapter structure includes two adapter elastic sheets inside the adapter space, and one end of each of the adapter elastic sheets has a fixing bump. The power input device is capable of being connected to the adapter plug. The first terminal and the second terminal of the power input device are capable of extending into the adapter space of the adapter structure. The first terminal and the second terminal are capable of being in contact with the two adapter elastic sheets, respectively. The fixing bumps of the two adapter elastic sheets are capable of being engaged with the first through hole of the first terminal and the second through hole of the second terminal, respectively.

In still another aspect, the present disclosure provides a power input device. The power input device includes a cover structure, and a plug structure. A bottom of the cover structure has an accommodation space. The plug structure is disposed in the accommodation space of the cover structure. Conductive terminals of the plug structure are capable of being folded and unfolded along a first rotation axis. The plug structure includes a first conductive terminal member, a second conductive terminal member, and a first electrical connection member. The first conductive terminal member includes a first terminal and a first shaft rod connected to the first terminal. The second conductive terminal member is spaced apart from the first conductive terminal member. The second conductive terminal member includes a second terminal and a second shaft rod connected to the second terminal. The first terminal and the second terminal are the conductive terminals of the plug structure. The first electrical connection member includes a conductive sheet and a first conductive elastic element. One end of the first conductive elastic element is connected to the conductive sheet, and another end of the first conductive elastic element abuts against the first shaft rod of the first conductive terminal member. A central axis of the first shaft rod and a central axis of the second shaft rod are both arranged along the first rotation axis. When the first terminal and the second terminal are folded or unfolded, the first shaft rod and the second shaft rod both rotate around the first rotation axis.

Therefore, in the power input device and the power module provided by the present disclosure, by virtue of "a plug structure being disposed in an accommodation space of a cover structure; conductive terminals of the plug structure being capable of being folded and unfolded along a first rotation axis, and capable of being rotated along a second rotation axis; the plug structure including a first conductive terminal member, a second conductive terminal member, a first electrical connection member, and a second electrical connection member; the first conductive terminal member including a first terminal and a first shaft rod connected to the first terminal; the second conductive terminal member being spaced apart from the first conductive terminal member; the second conductive terminal member including a second terminal and a second shaft rod connected to the second terminal; the first terminal and the second terminal being the conductive terminals of the plug structure; the first electrical connection member including a conductive sheet and a first conductive elastic element; an end of the first conductive elastic element being connected to the conductive sheet, and another end of the first conductive elastic element abutting against the first shaft rod; the second electrical connection member including a conductive ring and a second conductive elastic element; the conductive ring being disposed around the conductive sheet; an end or at least part of the second conductive elastic element being sleeved on or connected to the second shaft rod, and another end of the second conductive elastic element abutting against the conductive ring and being capable of moving along an annular path," the conductive terminals of the plug structure in any configuration can be maintained in the state of electrical connection, such as a configuration of being folded, unfolded, and rotated. Overall, the power input device of the present disclosure includes the plug structure having the functions of folding and turning. Furthermore, the conductive terminals (i.e., the first terminal and the second terminal) of the plug structure can be rotated by 360 degrees.

In addition, the conductive terminals of the power input device of the present disclosure can be used as connection terminals to be connected with an adapter plug (i.e., an adapter plugs having specifications of other countries).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
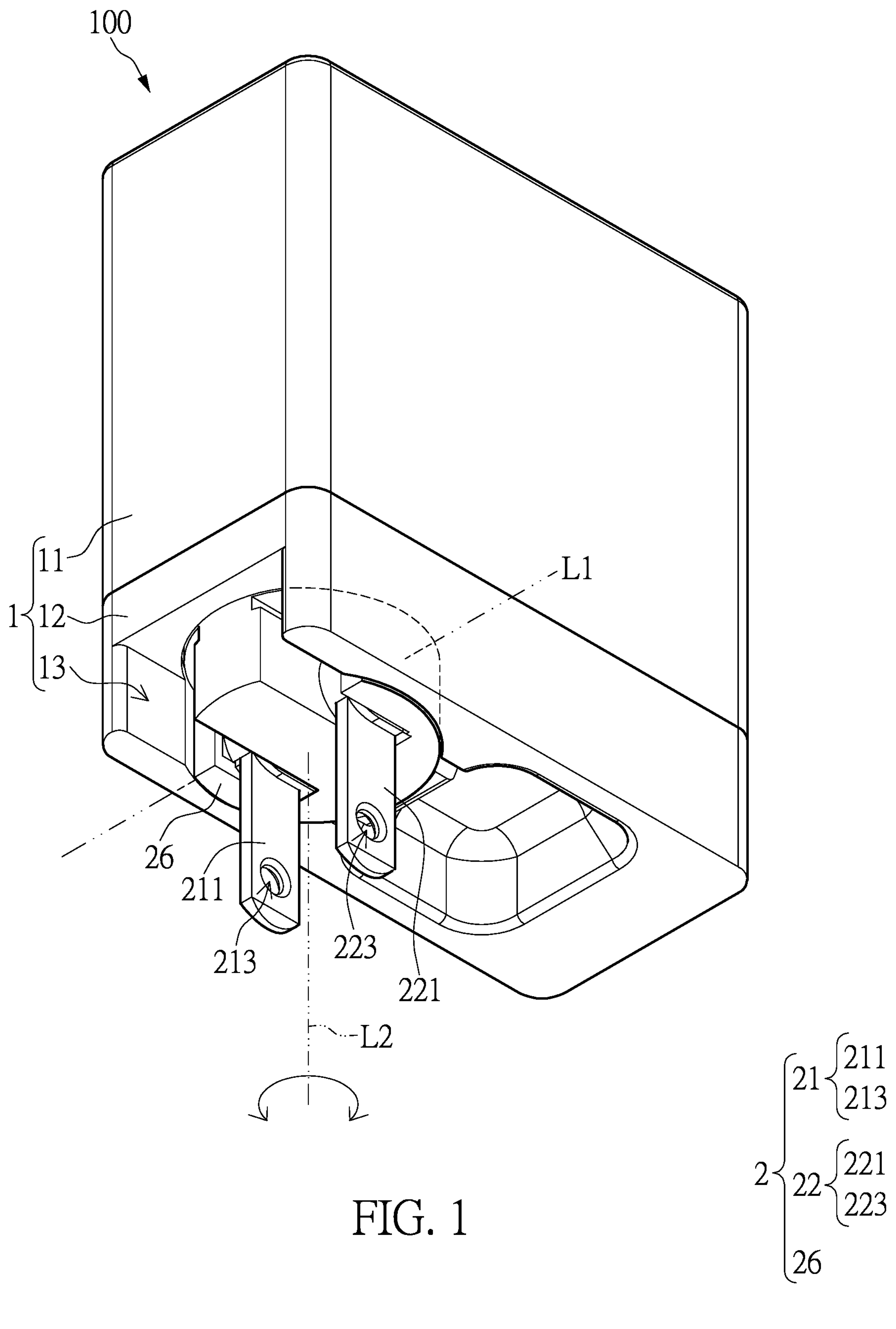
FIG. 1 is a schematic view of a power input device in an unfolded state according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
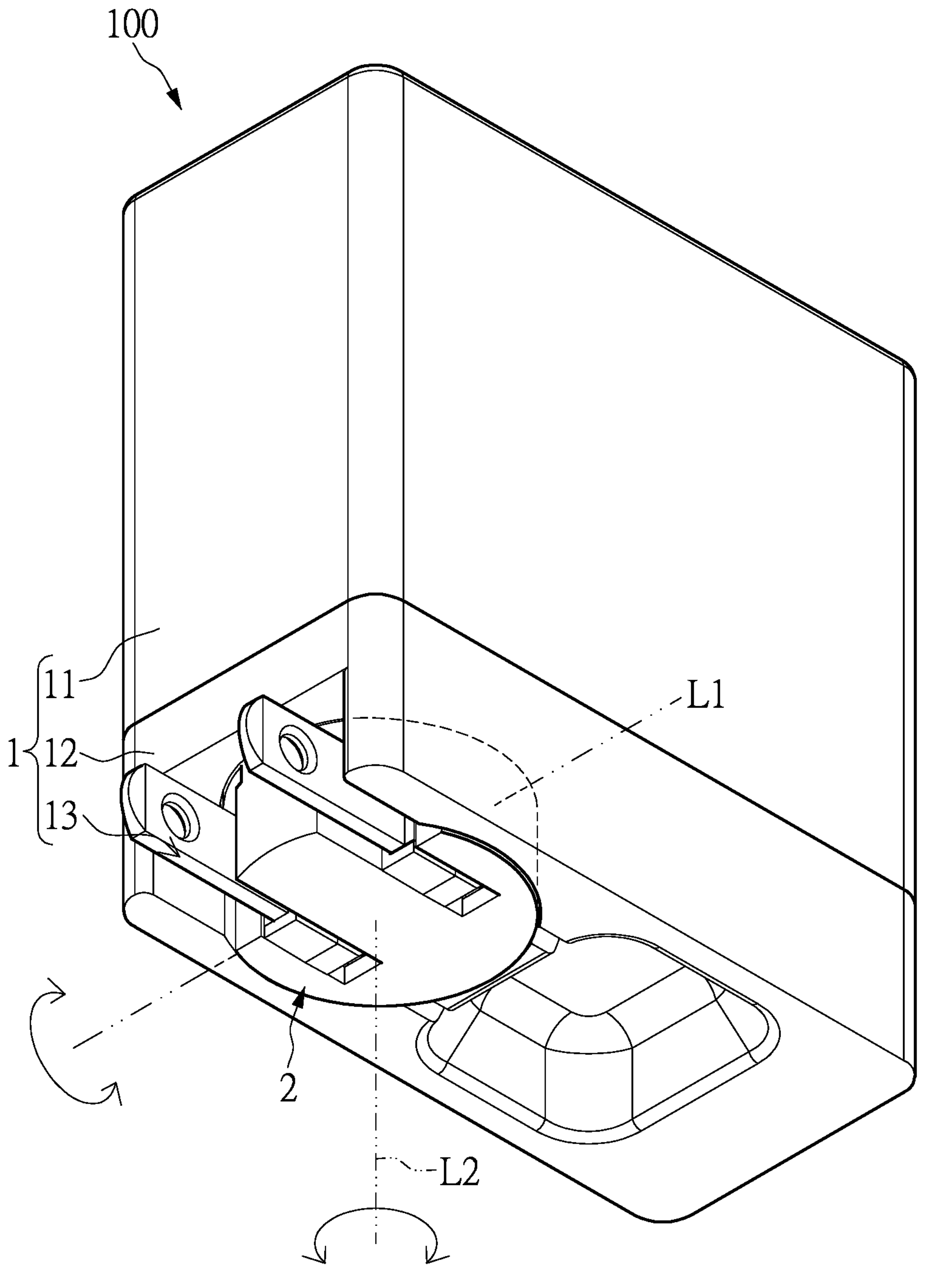
FIG. 2 is a schematic view of the power input device in a folded state according to one embodiment of the present disclosure.

Referring to FIG. 1 and FIG. 2, an embodiment of the present disclosure provides a power input device 100 that includes a cover structure 1, and a plug structure 2 disposed on the cover structure 1. Conductive terminals of the plug structure 2 are capable of being folded and unfolded relative to the cover structure 1 along a first rotation axis L1. In addition, the conductive terminals of the plug structure 2 are capable of being rotated relative to the cover structure 1 along a second rotation axis L2.

Figure 3:
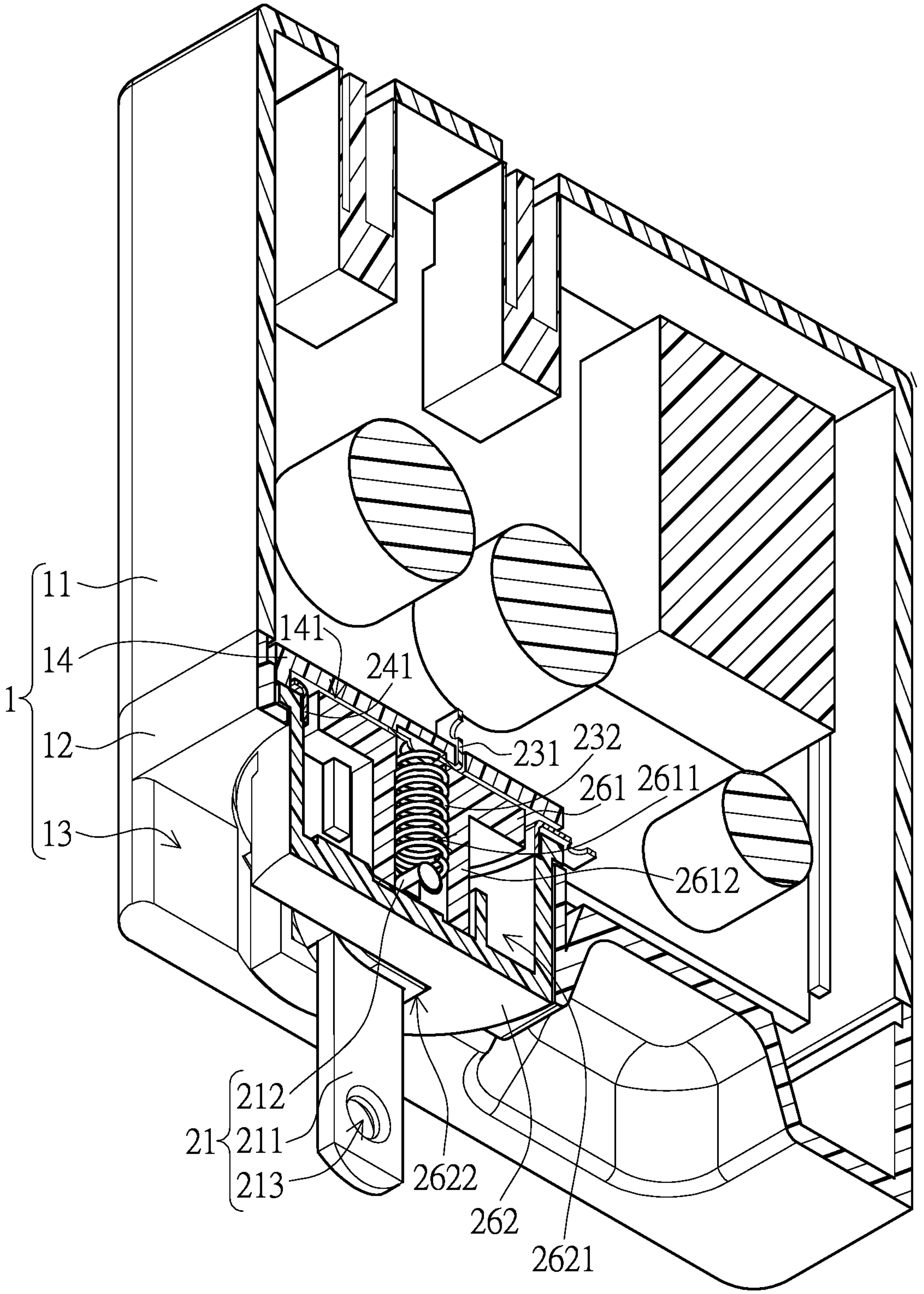
FIG. 3 is a cross-sectional view of the power input device according to one embodiment of the present disclosure.
Figure 4:
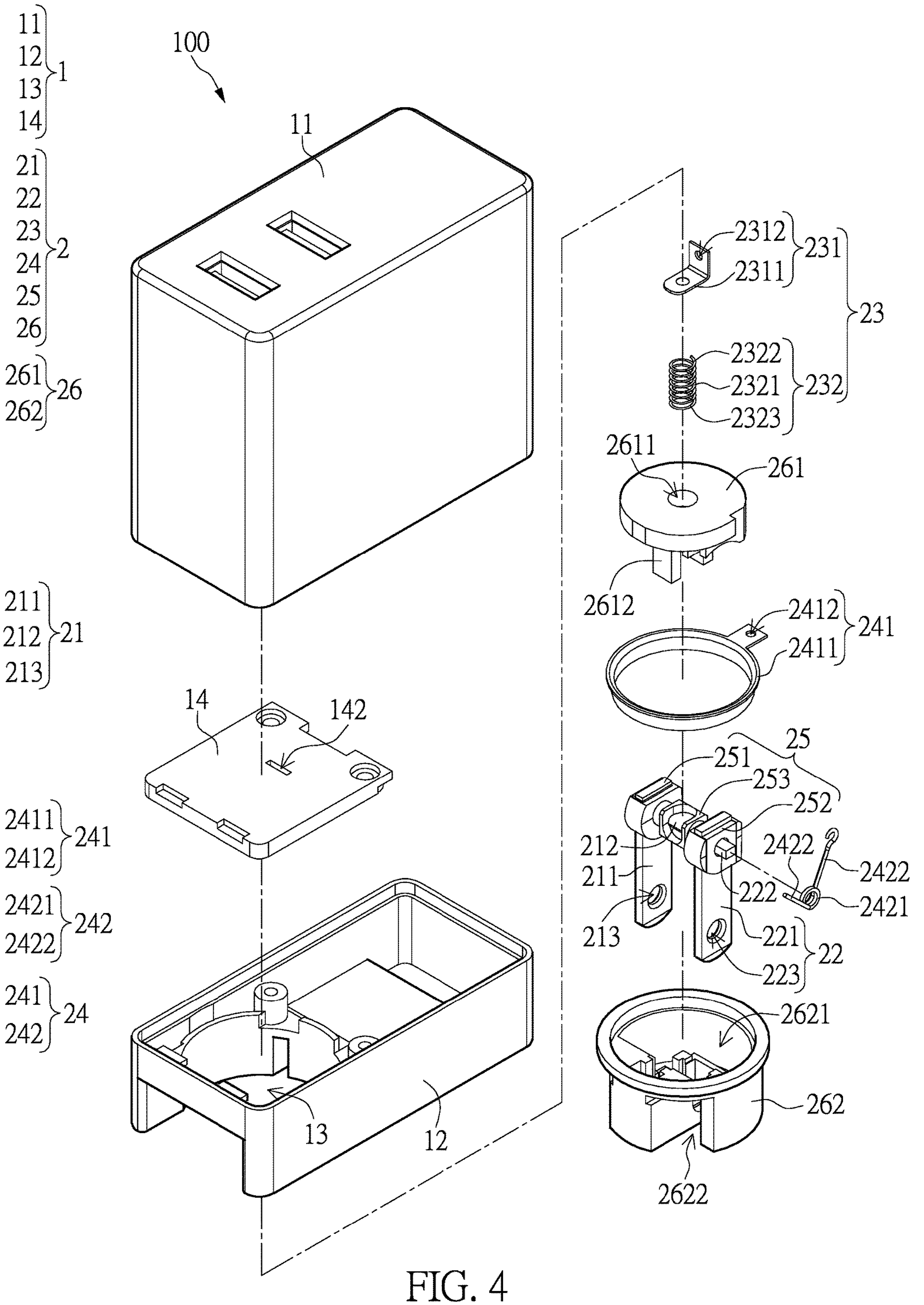
FIG. 4 is an exploded view of components of the power input device according to one embodiment of the present disclosure.
Figure 5:
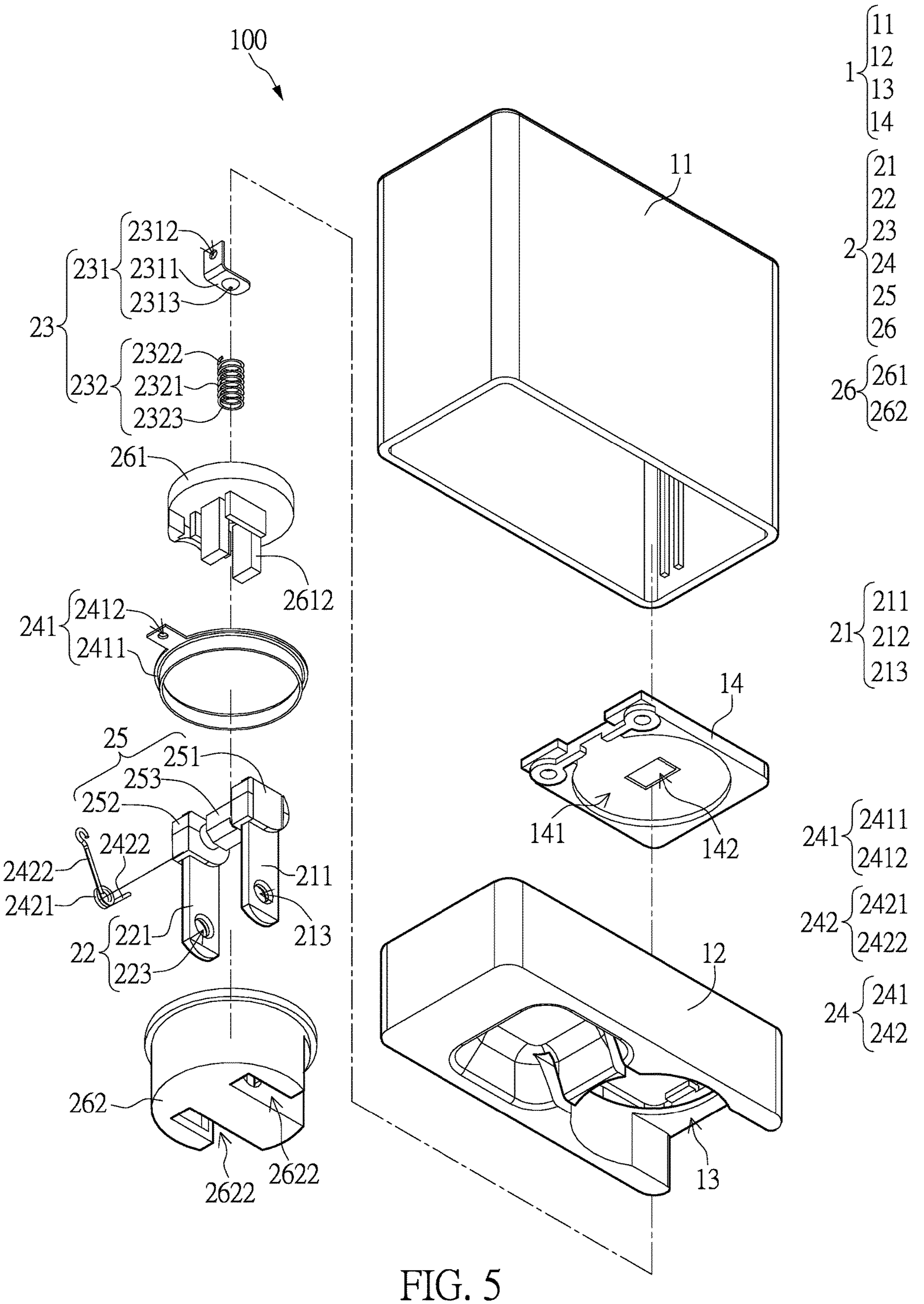
FIG. 5 is another exploded view of the components of the power input device according to one embodiment of the present disclosure.
Figure 6:
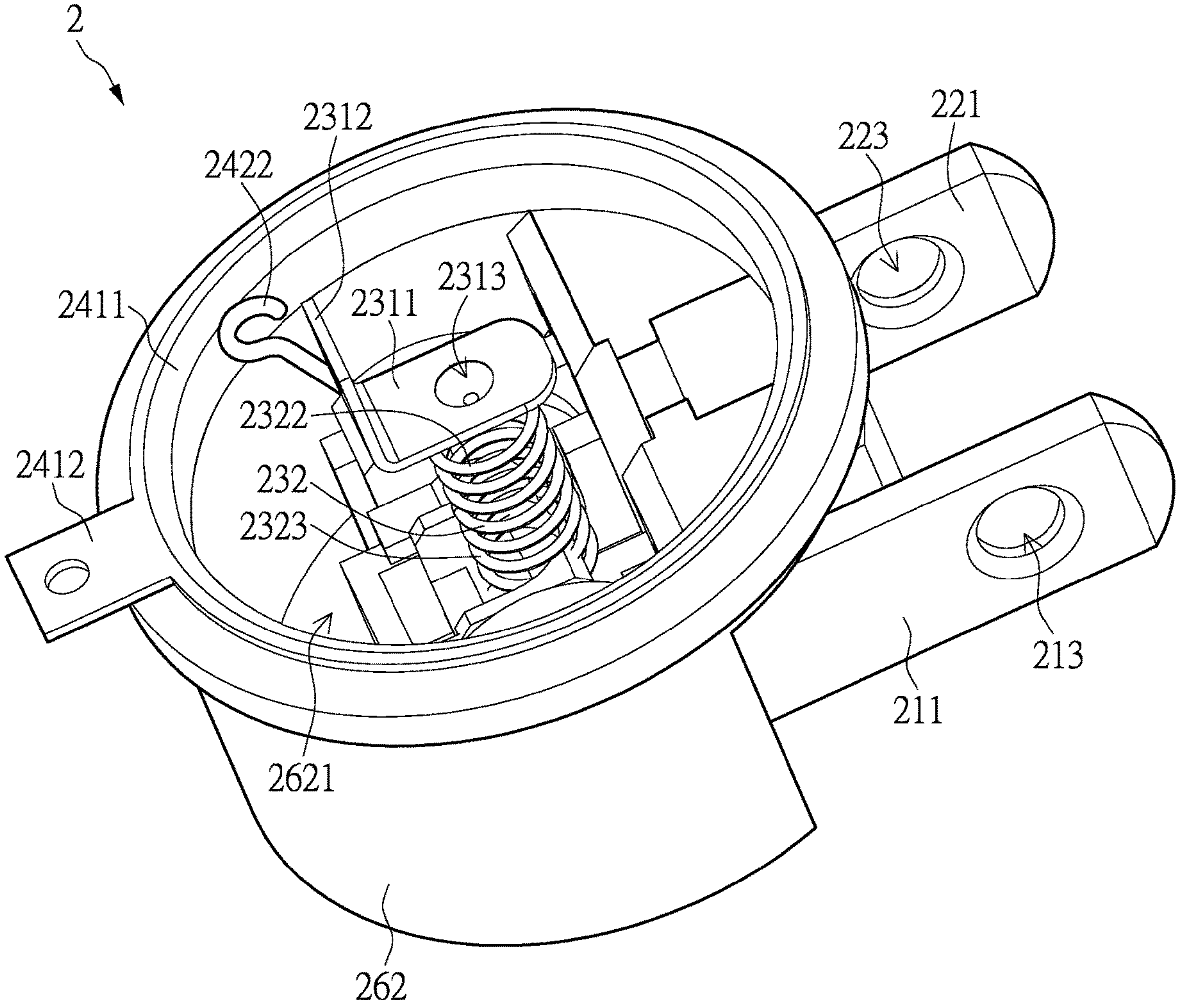
FIG. 6 is a schematic view of a structure of a plug structure according to one embodiment of the disclosure.
Figure 7:
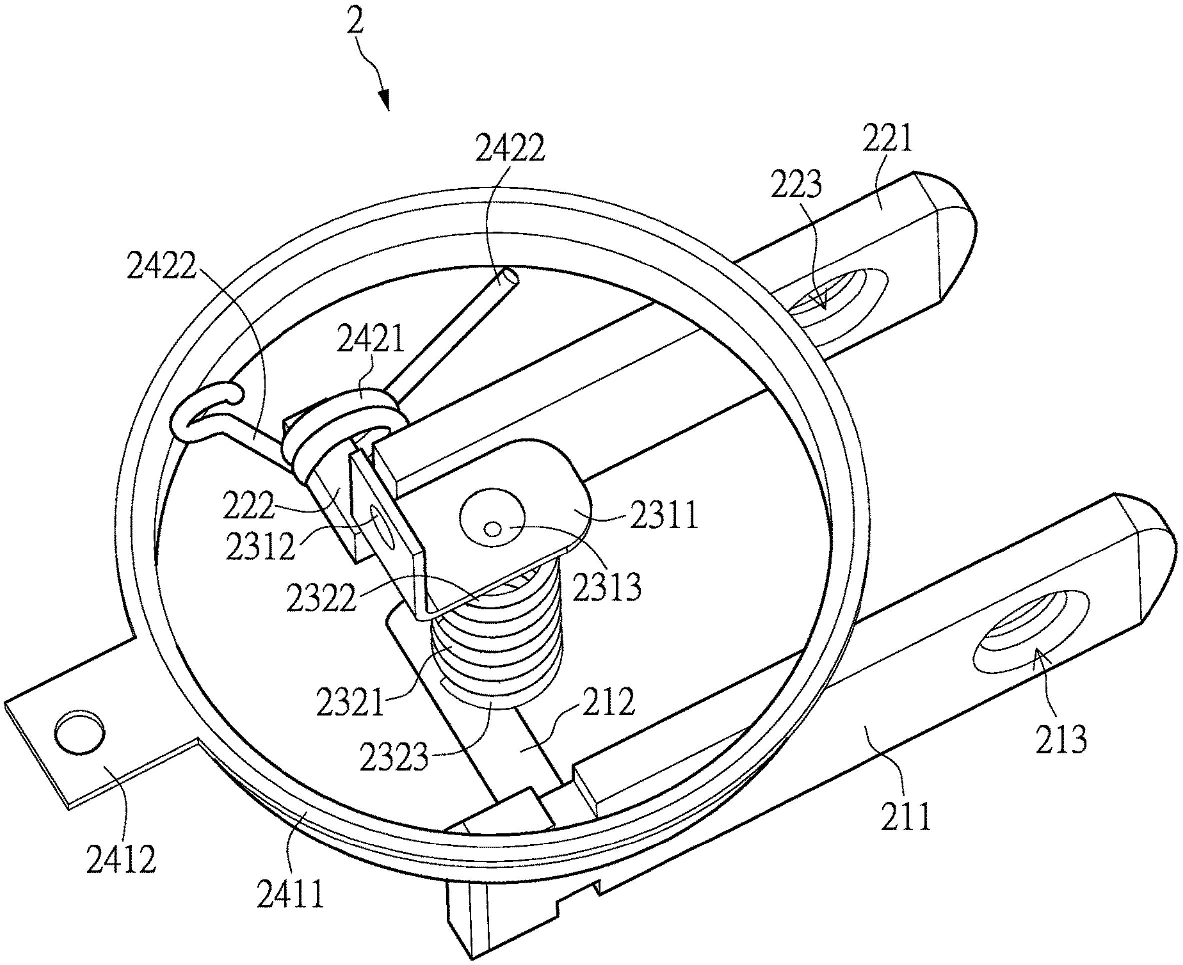
FIG. 7 is another schematic view of the structure of the plug structure according to one embodiment of the disclosure.
Figure 8:
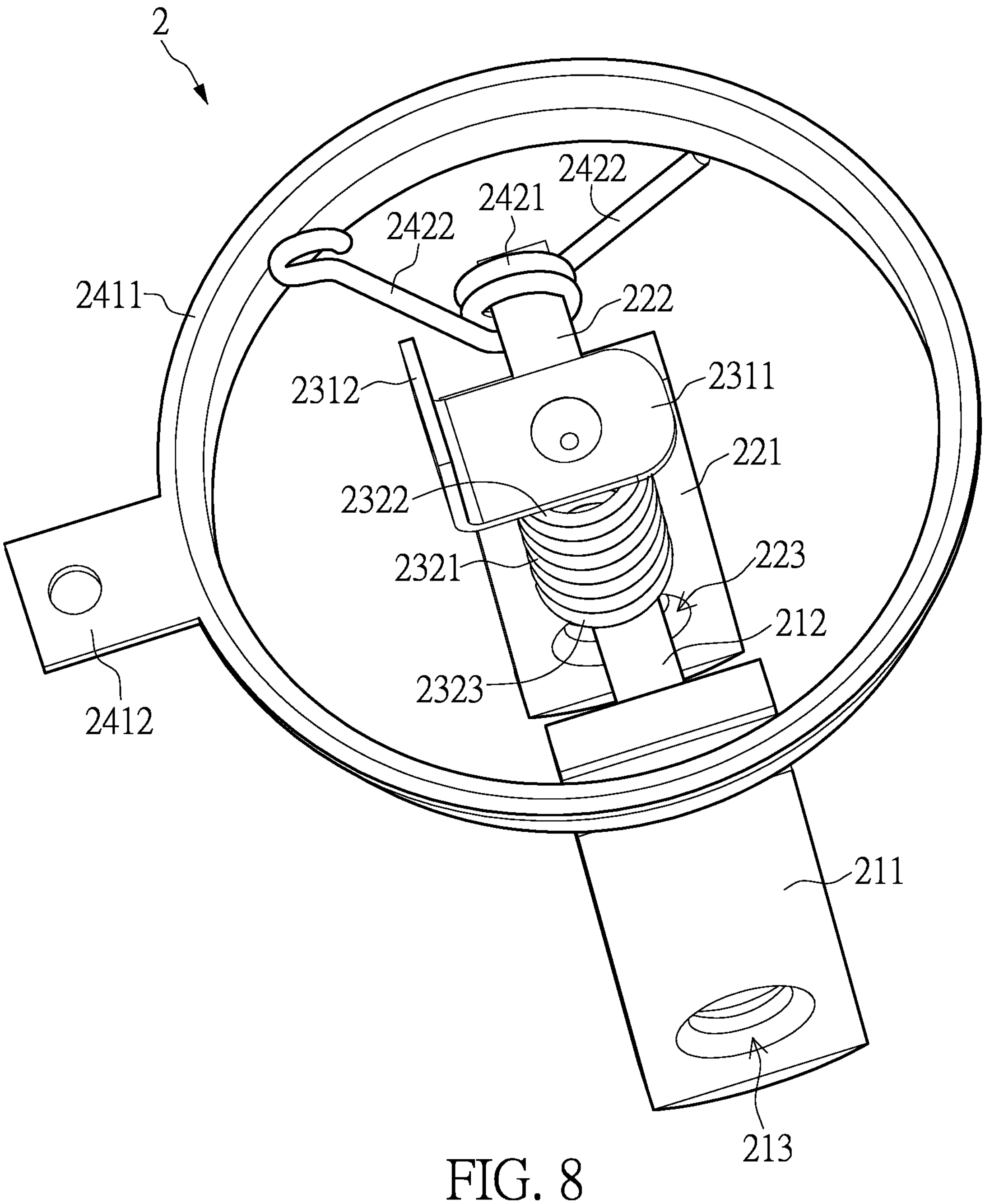
FIG. 8 is yet another schematic view of the structure of the plug structure according to one embodiment of the disclosure.
Figure 9:
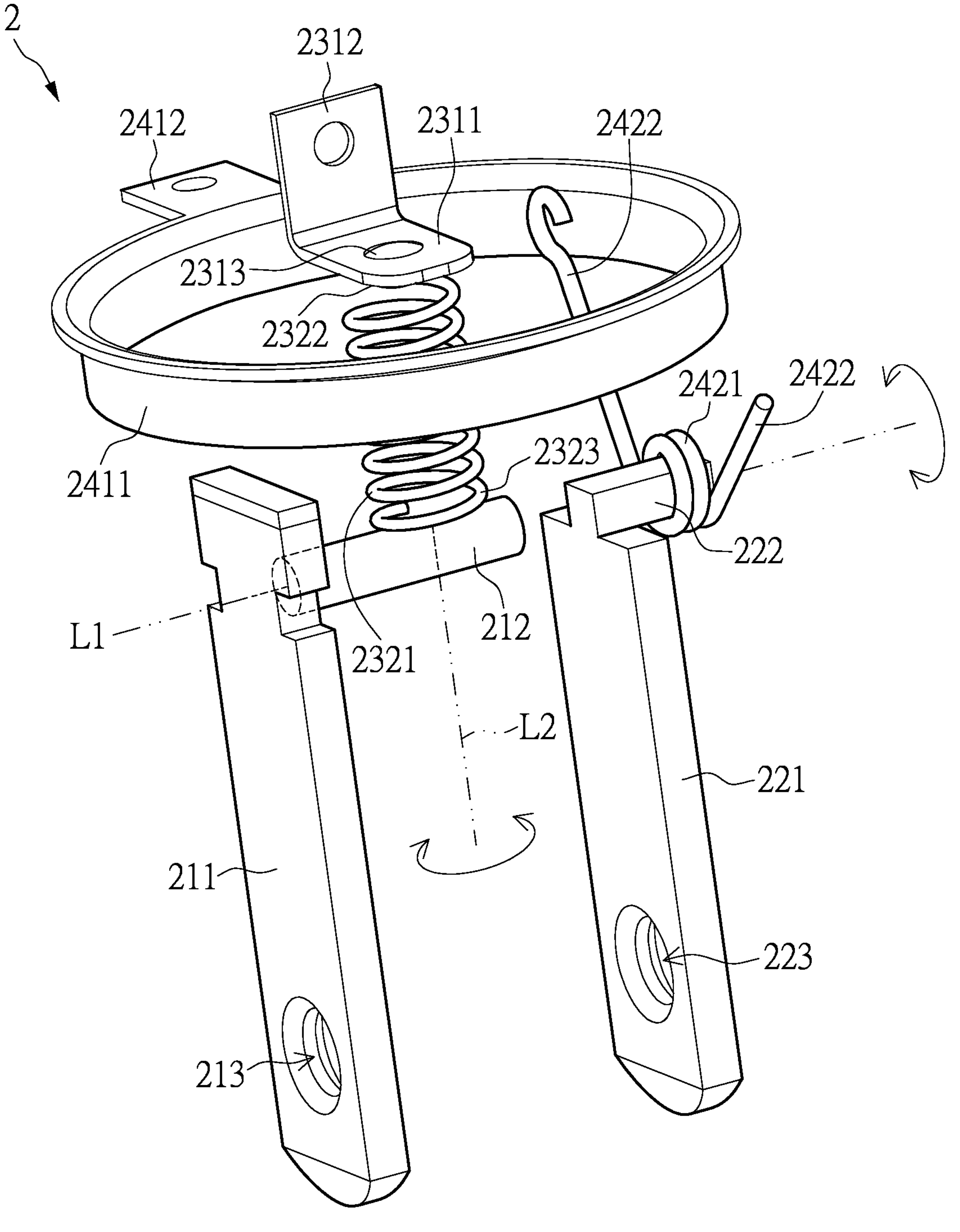
FIG. 9 is still another schematic view of the structure of the plug structure according to one embodiment of the disclosure.
Figure 10:
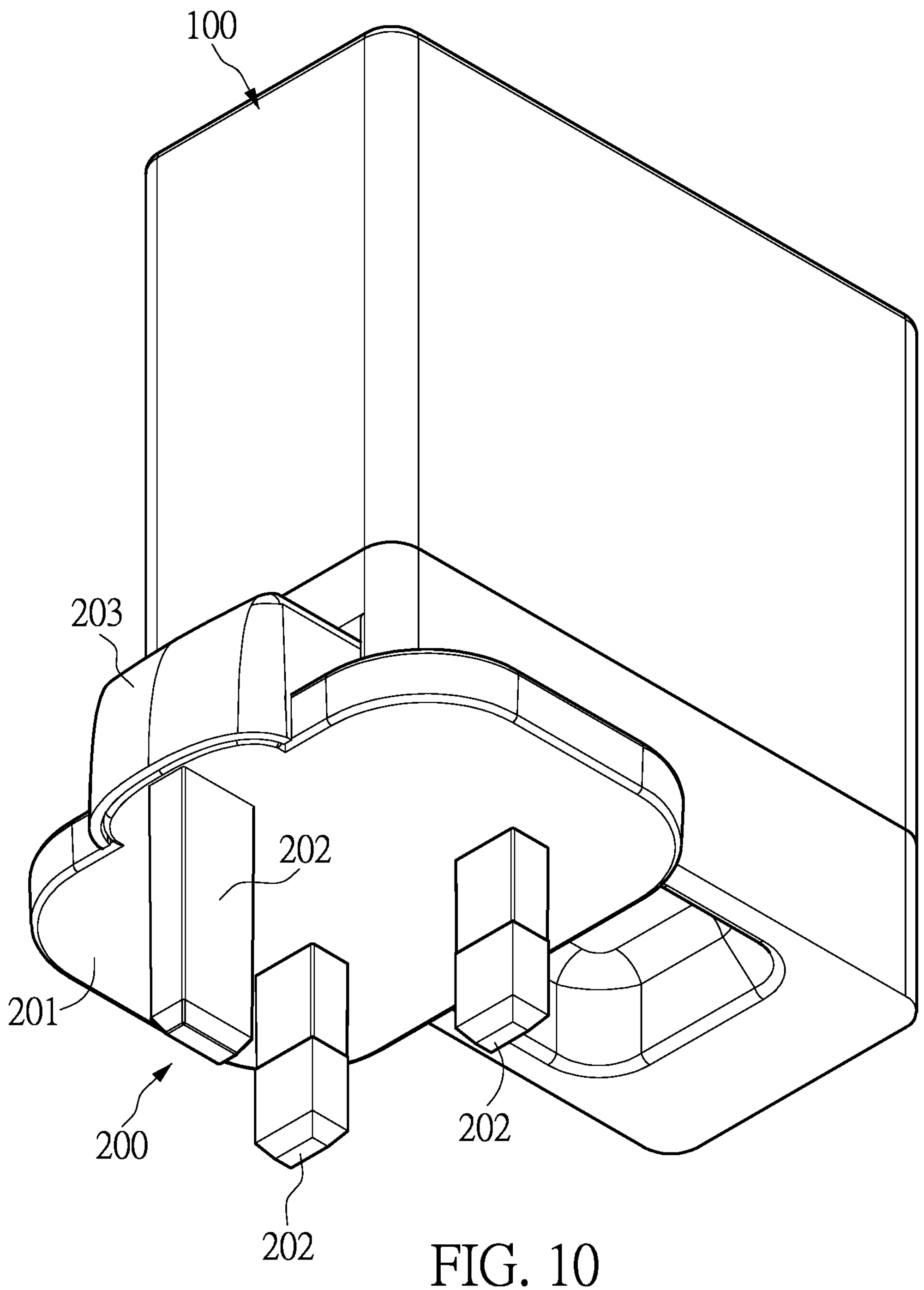
FIG. 10 is an assembled view of a power module according to one embodiment of the disclosure.
Figure 11:
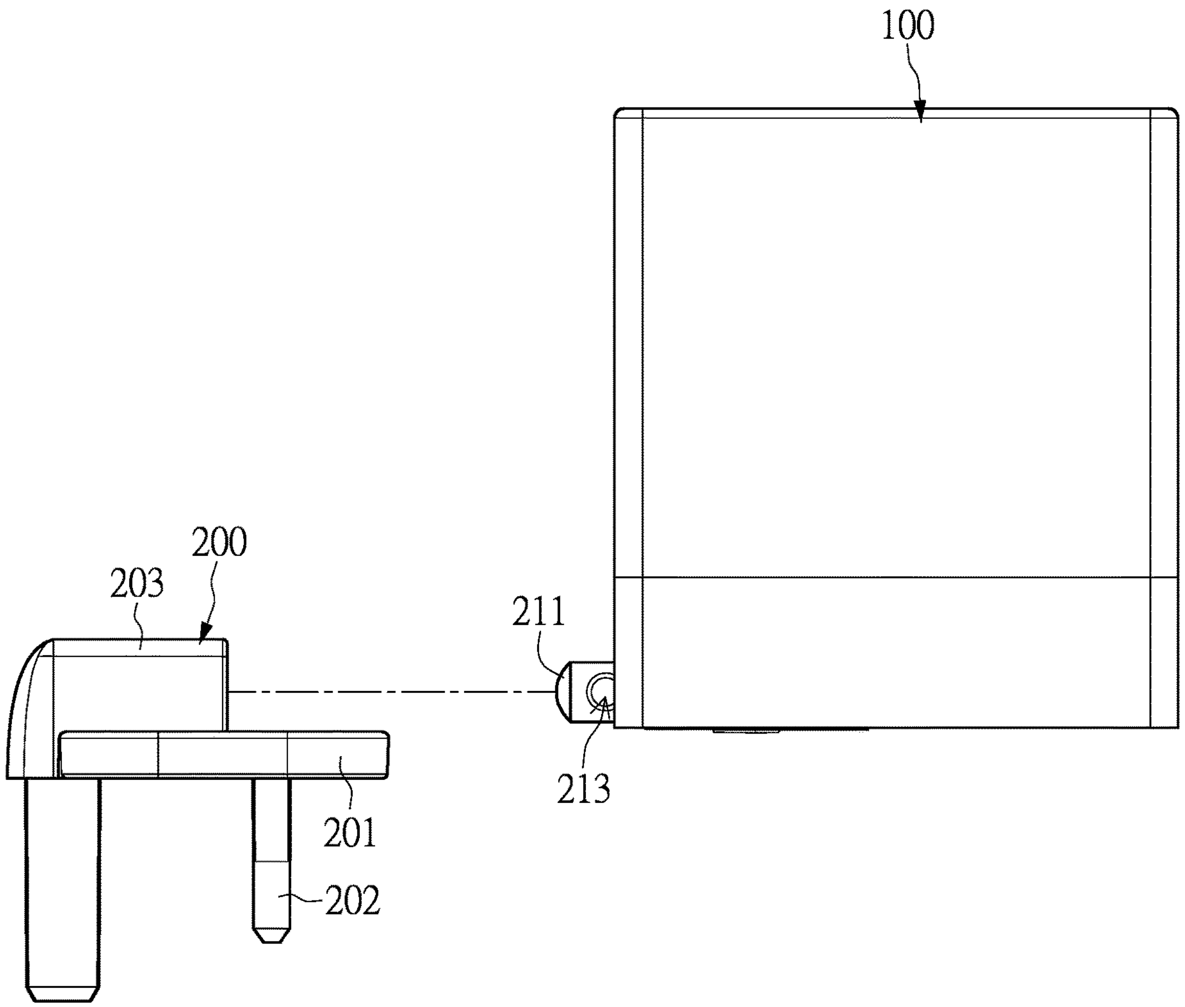
FIG. 11 is another assembled view of the power module according to one embodiment of the disclosure.
Figure 12:
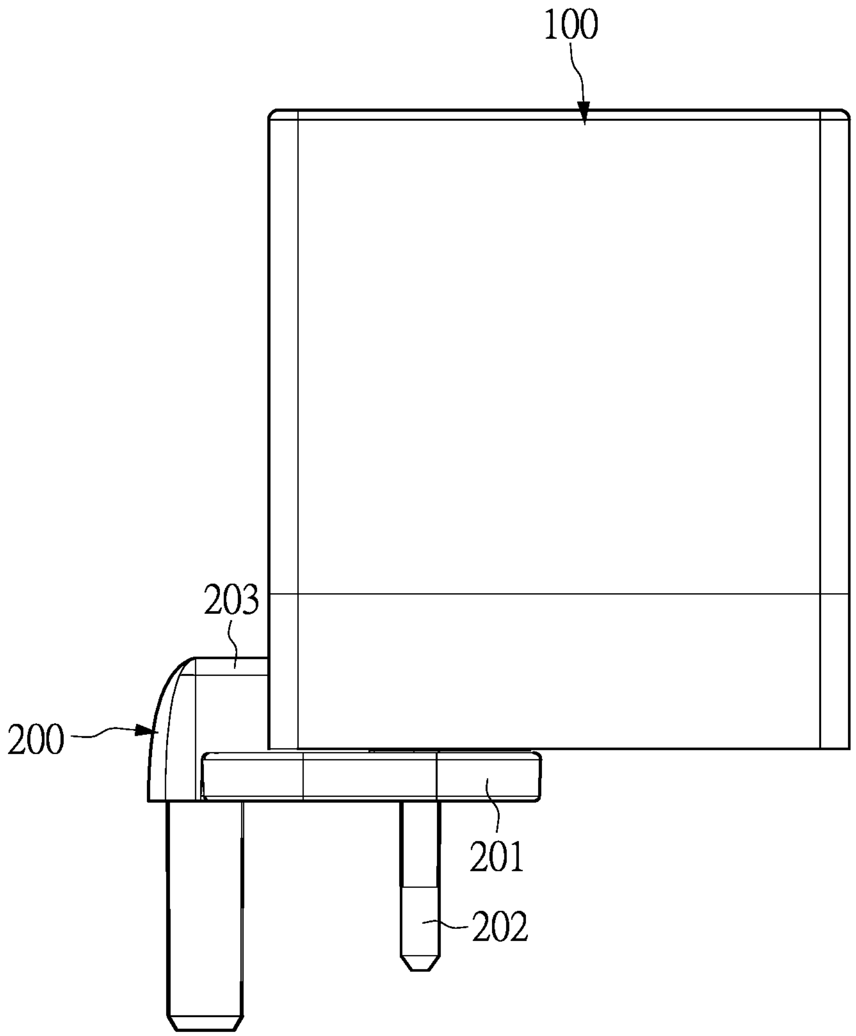
FIG. 12 is yet another assembled view of the power module according to one embodiment of the disclosure.
Figure 13:
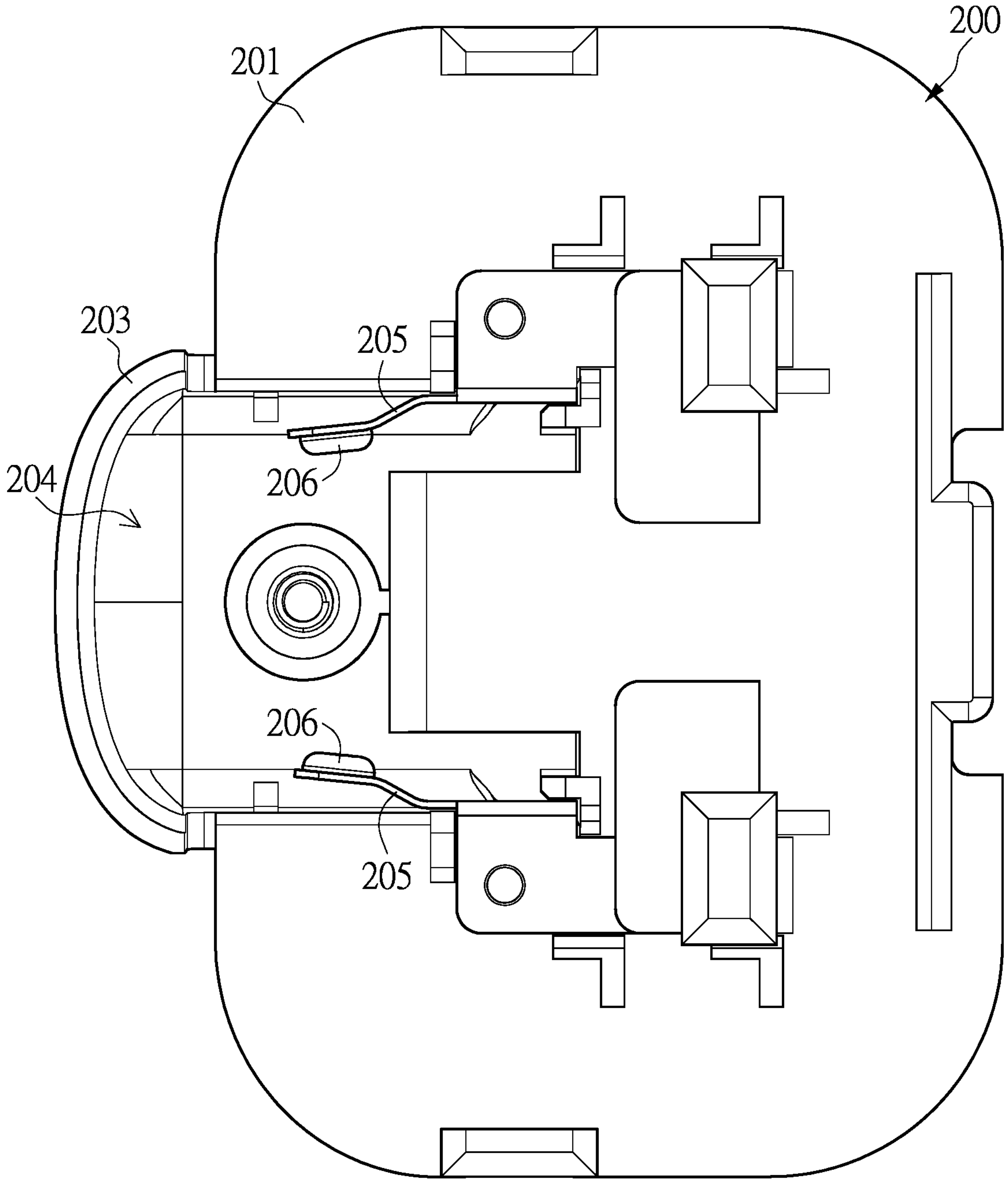
FIG. 13 is a bottom view of a structure of an adapter plug according to one embodiment of the disclosure.
Figure 14:
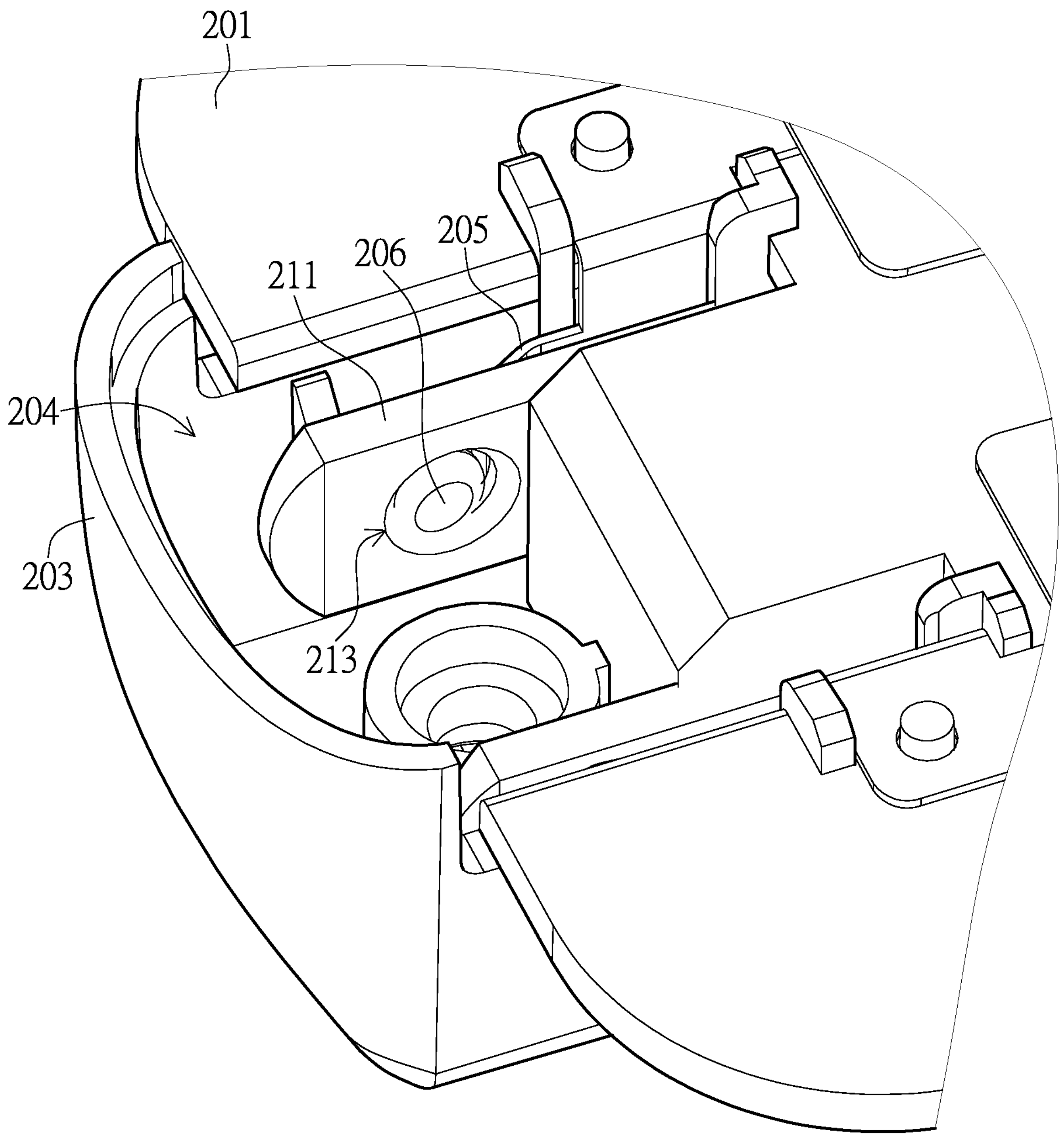
FIG. 14 is still another assembled view of the power module according to the embodiment of the disclosure.
Figure 15:
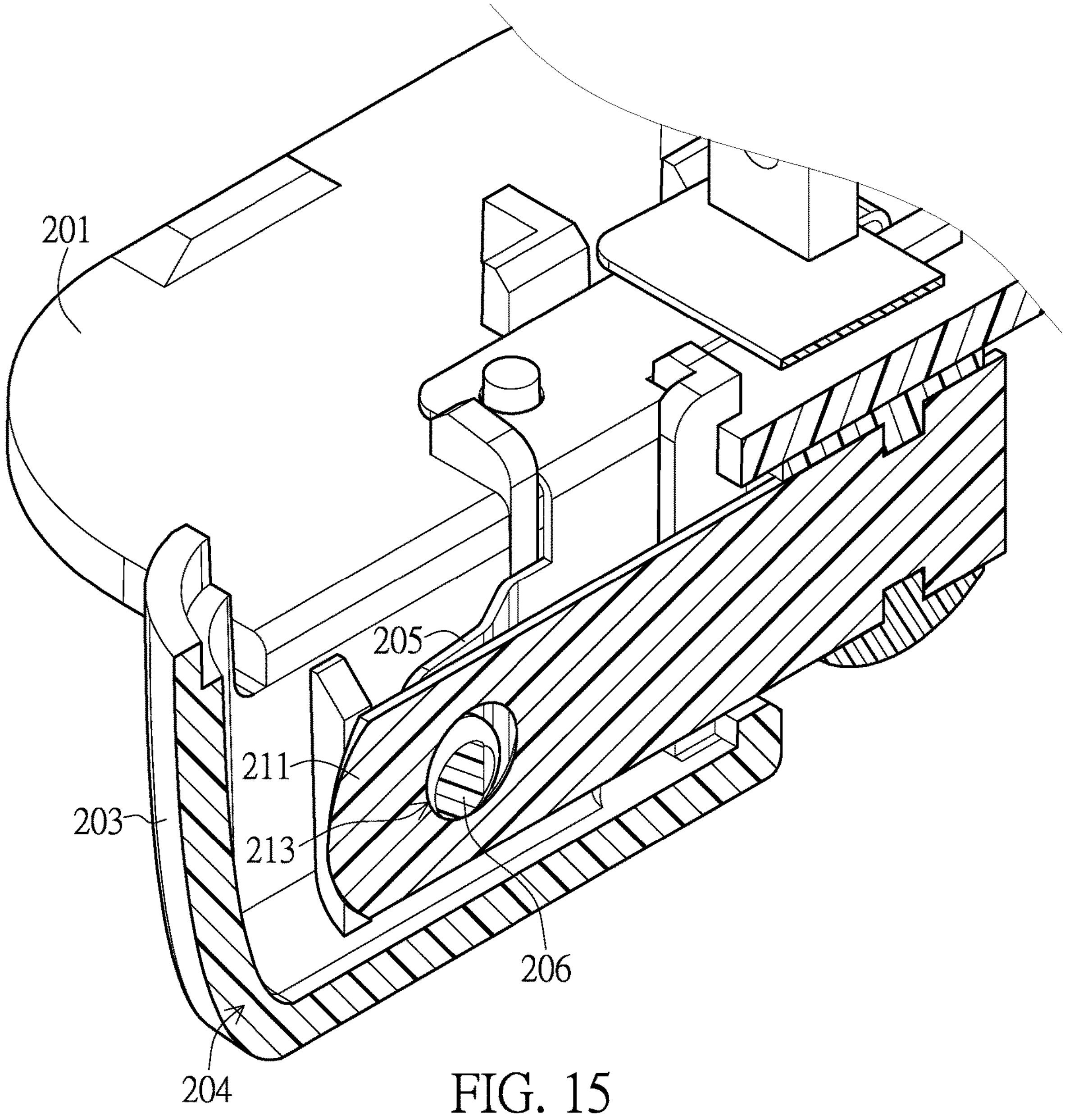
FIG. 15 is yet still another assembled view of the power module according to one embodiment of the disclosure.

Referring to FIG. 3, FIG. 4, and FIG. 5, more specifically, the cover structure 1 includes an upper cover 11 and a lower cover 12. The upper cover 11 can be assembled with the lower cover 12 to form an enclosure of the power input device 100. The lower cover 12 of the cover structure 1 has an accommodation space 13 for accommodating the plug structure 2. That is, the plug structure 2 is disposed in the accommodation space 13 of the lower cover 12 of the cover structure 1. The cover structure 1 further includes a cover plate 14. A bottom of the cover plate 14 has a circular groove 141 formed thereon, and an inner side of the circular groove 141 has a connection opening 142 in a shape of a rectangle. During assembly, the cover plate 14 is disposed between the upper cover 11 and the lower cover 12 and located above the accommodation space 13. The cover plate 14 is disposed above the plug structure 2, but the present disclosure is not limited thereto.

Referring to FIG. 3 to FIG. 5 and FIG. 6 to FIG. 9, specific structures of the plug structure 2 according to embodiments of the present disclosure and connection relationships between various components will be described in detail hereinafter, so that the conductive terminals of the plug structure 2 can achieve functions such as folding, unfolding, and rotating.

The plug structure 2 includes a first conductive terminal member 21, a second conductive terminal member 22, a first electrical connection member 23, a second electrical connection member 24, a terminal connection member 25, and a terminal fixing member 26.

The first electrical connection member 23 is electrically connected to the first conductive terminal member 21, and assists the first conductive terminal member 21 to be maintained in a state of electrical connection when the first conductive terminal member 21 is folded, unfolded, or rotated. In addition, the second electrical connection member 24 is electrically connected to the second conductive terminal member 22, and assists the second conductive terminal member 22 to be maintained in the state of electrical connection when the second conductive terminal member 22 is folded, unfolded, or rotated.

The terminal connection member 25 and the terminal fixing member 26 cooperate with each other to assist the first conductive terminal member 21, the second conductive terminal member 22, the first electrical connection member 23, and the second electrical connection member 24 to be arranged in the accommodation space 13 of the lower cover 12 of the cover structure 1.

It is worth mentioning that, in the present embodiment, the plug structure 2 is assembled with the cover structure 1 to form a complete power input device 100 as an example, but the present disclosure is not limited thereto. The plug structure 2 can also be a product that is separately sold to be used in combination with different components.

More specifically, the first conductive terminal member 21 includes a first terminal 211 and a first shaft rod 212 connected to one end of the first terminal 211, in which the first shaft rod 212 is substantially perpendicular to the first terminal 211. Furthermore, another end of the first terminal 211 has a first through hole 213. In the present embodiment, the first terminal 211 and the first shaft rod 212 are integrally formed with each other. The first terminal 211 is a flat and elongated body, the first shaft rod 212 is a circular cylinder, and the first through hole 213 is a circular hole, but the present disclosure is not limited thereto.

The second conductive terminal member 22 is disposed adjacent to the first conductive terminal member 21. The second conductive terminal member 22 includes a second terminal 221 and a second shaft rod 222 connected to one end of the second terminal 221. The second shaft rod 222 is substantially perpendicular to the second terminal 221. Furthermore, another end of the second terminal 221 has a second through hole 223. In the present embodiment, the second terminal 221 and the second shaft rod 222 are integrally formed with each other. The second terminal 221 is a flat and elongated body, the second shaft rod is a polygonal column (e.g., a regular quadrangular column), and the second through hole 223 is a circular hole that corresponds in position to the first through hole 213, but the present disclosure is not limited thereto.

It should be noted that "two objects (i.e., the shaft rod and the conductive terminal) being substantially perpendicular to each other" referred to in the present disclosure indicates that an included angle between the two objects is 90 degrees, or close to 90 degrees (i.e., from 80 degrees to 100 degrees), but the present disclosure is not limited thereto.

As shown in FIG. 6 to FIG. 9, when the power input device 100 is in an assembled state, the first terminal 211 and the second terminal 221 are spaced apart from each other and arranged in parallel with each other. The first shaft rod 212 and the second shaft rod 222 are also spaced apart from each other. A central axis of the first shaft rod 212 and a central axis of the second shaft rod 222 are both disposed along the first rotation axis L1 and overlap the first rotation axis L1. The first terminal 211 and the second terminal 221 can be folded or unfolded together to respectively drive the first shaft rod 212 and the second shaft rod 222 to be rotated around the first rotation axis L1. It is worth mentioning that, in the second conductive terminal member 22, the second shaft rod 222 is disposed from the one end of the second terminal 221 in a direction away from the first conductive terminal member 21, but the present disclosure is not limited thereto. The first terminal 211 and the second terminal 221 can be respectively inserted into an adapter plug, or plug holes of a socket.

Referring to FIG. 3 to FIG. 5 and FIG. 6 to FIG. 9, the first electrical connection member 23 includes a conductive sheet 231 and a first conductive elastic element 232. The conductive sheet 231 has a sheet-like connection portion 2311 and a sheet-like extension portion 2312 that extends from one end of the sheet-like connection portion 2311. The sheet-like connection portion 2311 and the sheet-like extension portion 2312 substantially form an L-shaped structure. One surface of the sheet-like connection portion 2311 away from the sheet-like extension portion 2312 has a circular protruding portion 2313 formed thereon.

Figure 16:
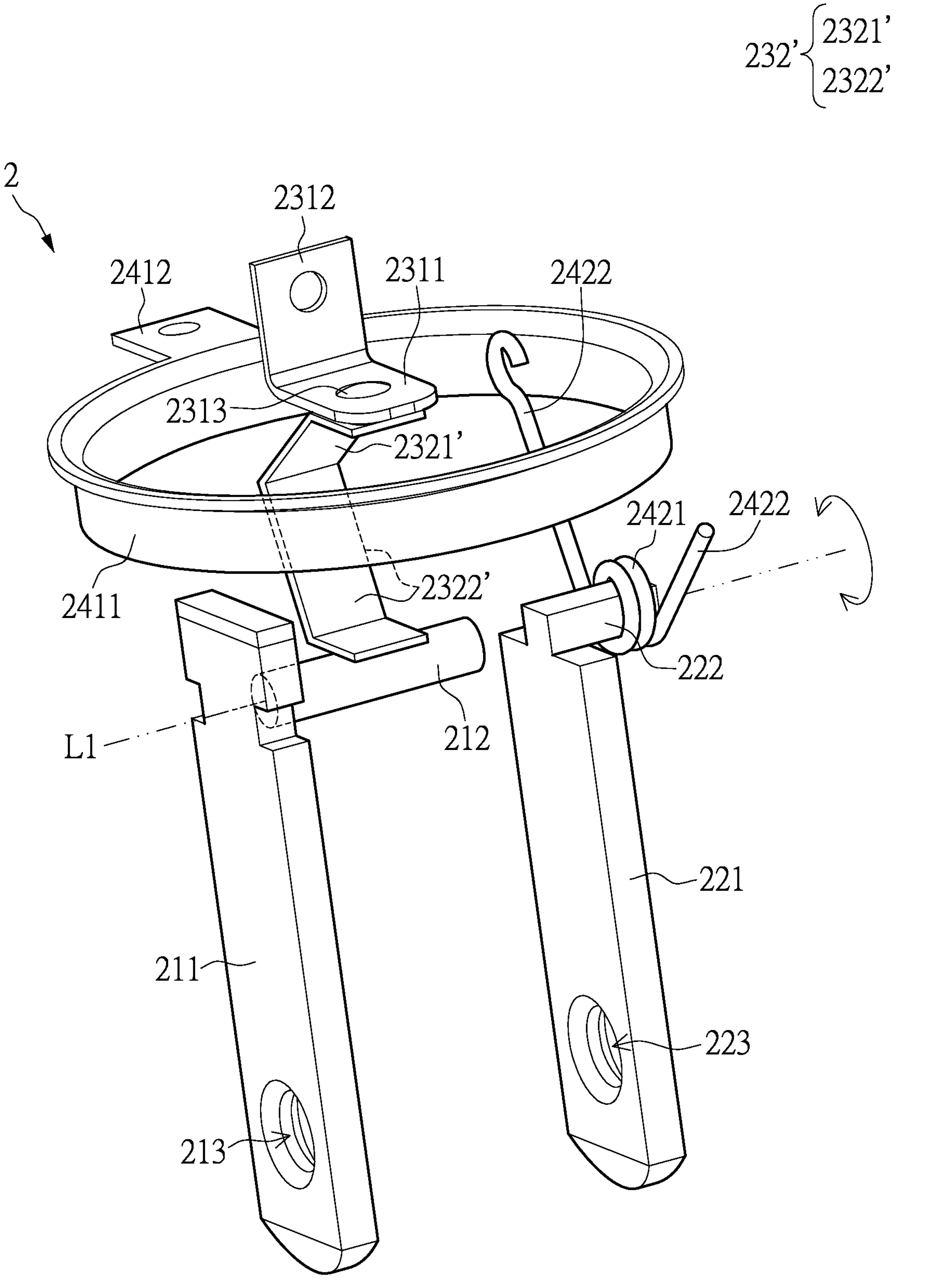
FIG. 16 is a schematic view of one variation of a first conductive elastic element of the present disclosure.

One end of the first conductive elastic element 232 is connected to the conductive sheet 231, and another end of the first conductive elastic element 232 abuts against the first shaft rod 212. More specifically, in the present embodiment, the first conductive elastic element 232 has a strip body 2321, and the two ends of the first conductive elastic element 232 are respectively defined as a connecting end 2322 and an abutting end 2323. In the present embodiment, the first conductive elastic element 232 is a coil spring (also called as a helical spring), but the present disclosure is not limited thereto. The first conductive elastic element 232 can also be, for example, a conductive strip (e.g., a conductive silicone strip). Alternatively, as shown in FIG. 16, a first conductive elastic element 232' can be a sheet-like structure, which has a first sheet body 2321' and a second sheet body 2322' connected to the first sheet body 2321'. The first sheet body 2321' and the second sheet body 2322' have an included angle there between to form a V-shaped structure. The first sheet body 2321' is connected to the sheet-like connection portion 2311 of the conductive sheet 231. The second sheet body 2322' abuts against the first shaft rod 212 of the first conductive terminal member 21 to provide an elastic contact force.

When the power input device 100 is in the assembled state, the conductive sheet 231 is fixedly disposed on the cover plate 14 of the cover structure 1 and is located inside the circular groove 141 of the cover plate 14. The sheet-like extension portion 2312 of the conductive sheet 231 protrudes from the connection opening 142 toward the upper cover 11.

The first conductive elastic element 232 is disposed on a lower side of the conductive sheet 231 (i.e., one side of the conductive sheet 231 having the circular protruding portion 2313). One end (i.e., the connecting end 2322) of the first conductive elastic element 232 is configured to be connected to the sheet-like connection portion 2311 of the conductive sheet 231, and to be sleeved on the circular protruding portion 2313 so as to be positioned thereto. Another end (i.e., the abutting end 2323) of the first conductive elastic element 232 is configured to abut against the first shaft rod 212 of the first conductive terminal member 21 so as to be electrically connected with the first conductive terminal member 21.

Furthermore, a length direction of the first conductive elastic element 232 (i.e., the coil spring) is disposed along the second rotation axis L2. In other words, the first conductive elastic element 232 is disposed along the second rotation axis L2 and overlaps the second rotation axis L2, but the present disclosure is not limited thereto.

In addition, when the first terminal 211 is folded or unfolded to drive the first shaft rod 212 to be rotated relative to the first rotation axis L1, or when the first terminal 211 rotates around the second rotation axis L2 to drive the first shaft rod 212 to rotate, the abutting end 2323 of the first conductive elastic element 232 can continuously abut against the first shaft rod 212 that has a cylindrical shape. The first conductive elastic element 232 can provide an elastic contact force to the first shaft rod 212, and enable the first conductive terminal member 21 to continuously maintain the state of electrical connection through the connection of the first electrical connection member 23. In addition, the sheet-like extension portion 2312 is configured to be connected with wires or electronic components (not shown in the figures) disposed inside the cover structure 1 to transmit electricity.

Referring to FIG. 3 to FIG. 5 and FIG. 6 to FIG. 9, the second electrical connection member 24 includes a conductive ring 241 and a second conductive elastic element 242. The conductive ring 241 is disposed to surround the conductive sheet 231. One end or at least one part of the second conductive elastic element 242 is sleeved or connected to the second shaft rod 222. Another end of the second conductive elastic element 242 abuts against the conductive ring 241 and can move along an annular path. More specifically, in the embodiment of the present disclosure, the conductive ring 241 has an annular portion 2411 and an extension portion 2412 that extends from an outer edge of the annular portion 2411. The extension portion 2412 is sheet-shaped, but the present disclosure is not limited thereto. In addition, the second conductive elastic element 242 has a spiral body 2421 and two extension rods 2422 that respectively extends from two ends of the spiral body 2421. The two extension rods 2422 have an included angle of substantially from 80 to 100 degrees. In the present embodiment, the second conductive elastic element 242 is a torsion spring, but the present disclosure is not limited thereto.

When the power input device 100 is in the assembled state, the conductive ring 241 is disposed on the cover plate 14 of the cover structure 1 and embedded in the inner side of the circular groove 141 of the cover plate 14. Furthermore, the annular portion 2411 of the conductive ring 241 is disposed to surround the conductive sheet 231 and is also a fixed element.

Figure 17:
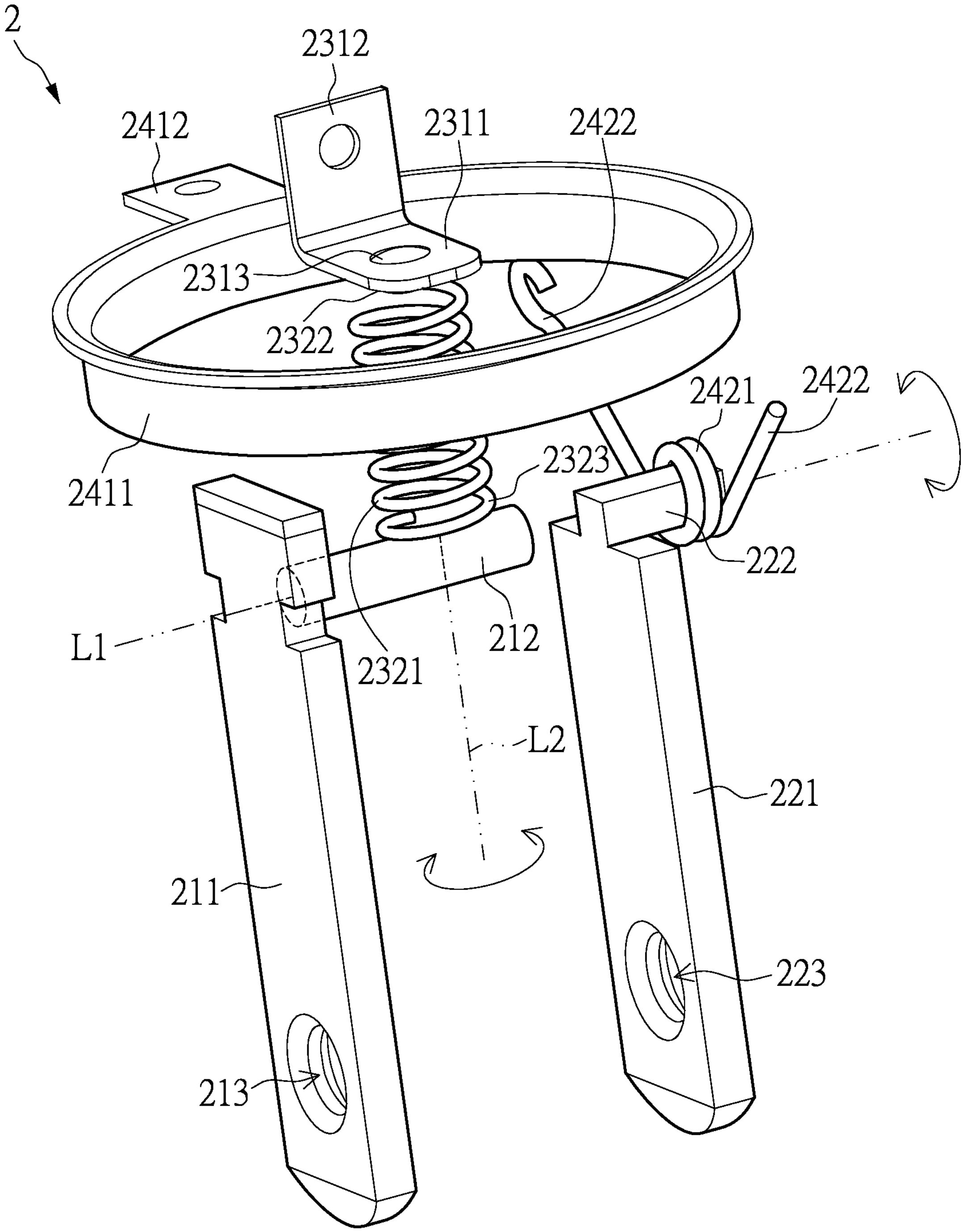
FIG. 17 is a schematic view of one variation of a second conductive elastic element of the present disclosure.
Figure 18:
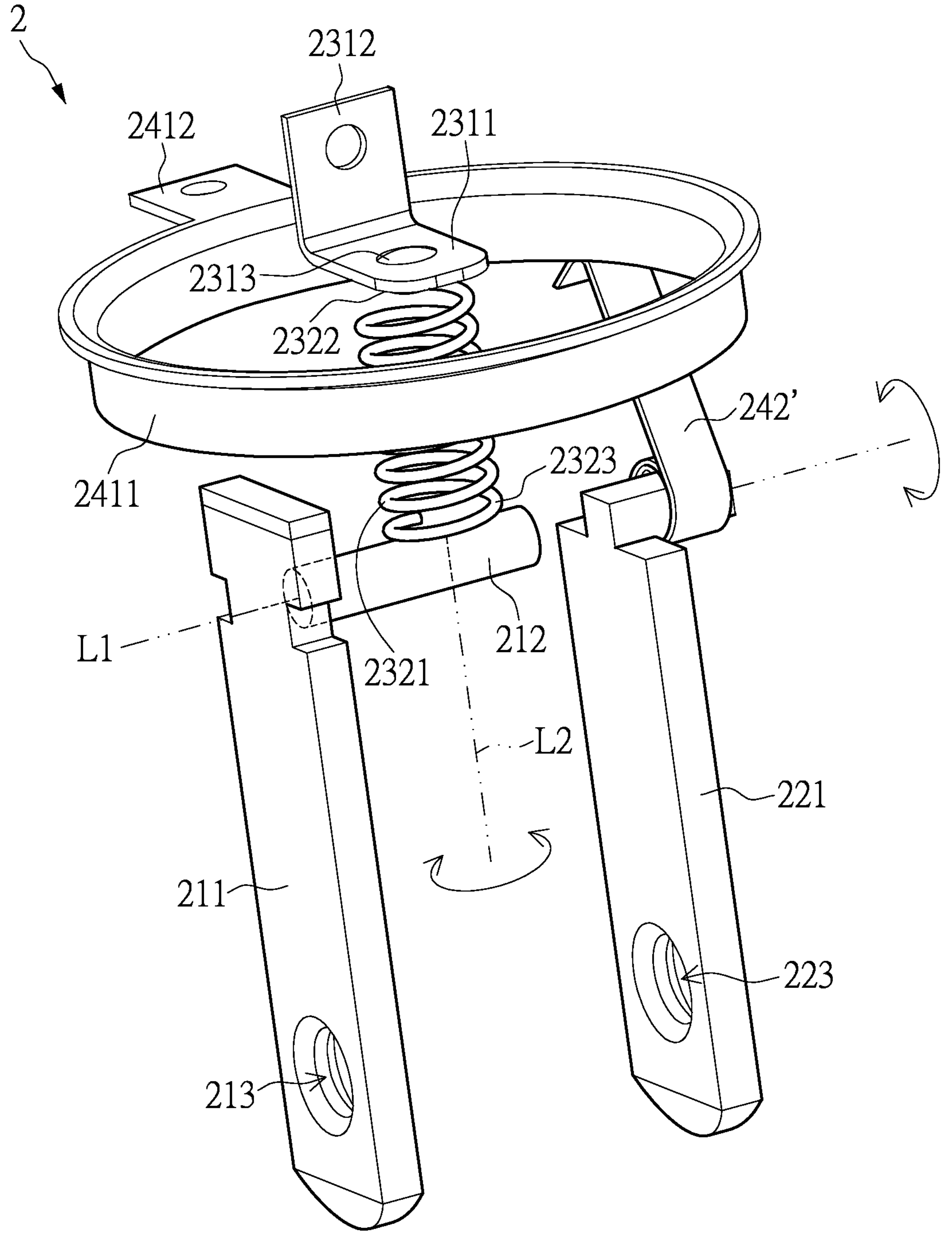
FIG. 18 is another schematic view of one variation of the second conductive elastic element of the present disclosure.
Figure 19:
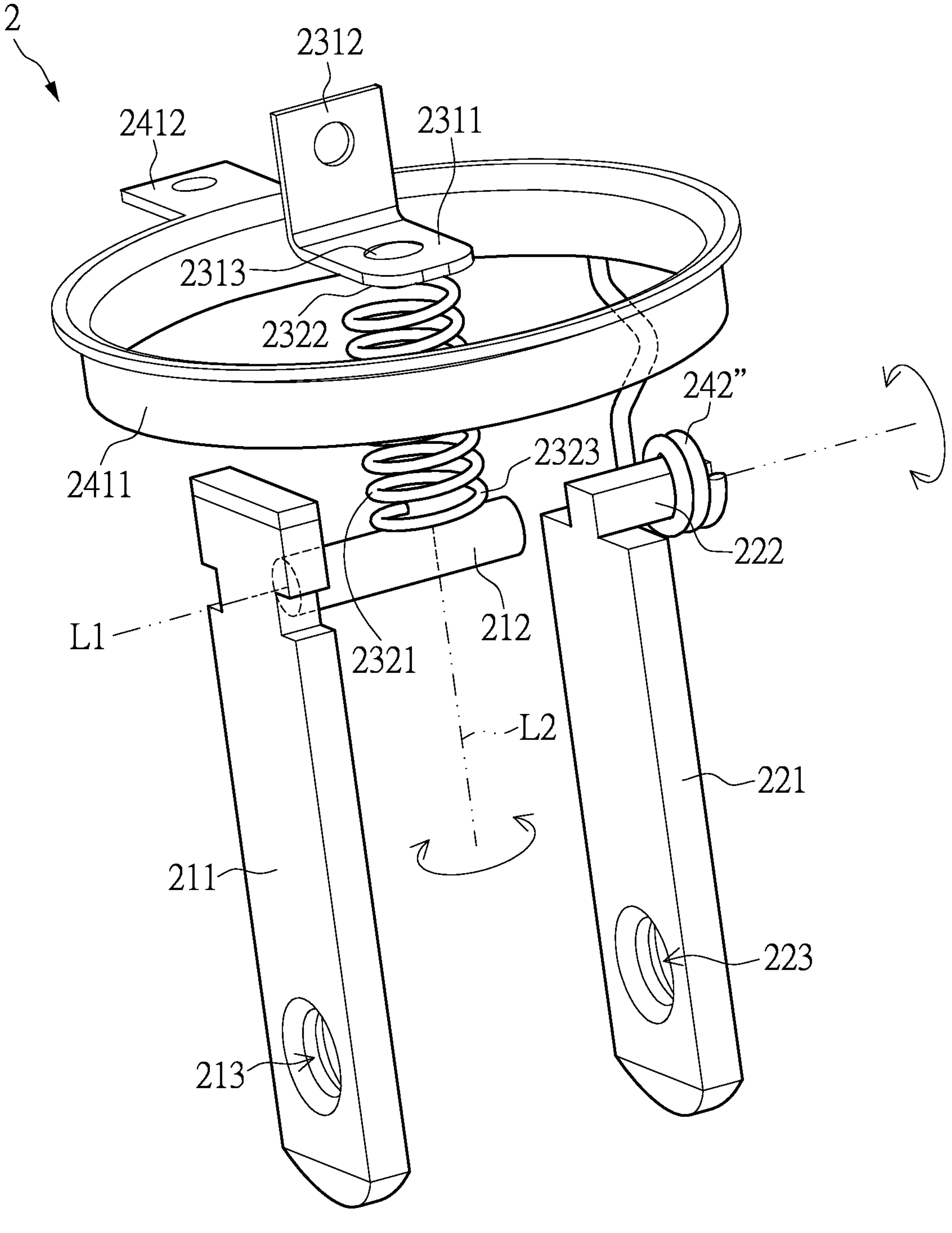
FIG. 19 is yet another schematic view of one variation of the second conductive elastic element of the present disclosure.

The spiral body 2421 of the second conductive elastic element 242 (i.e., the torsion spring) is sleeved on the second shaft rod 222 of the second conductive terminal member 22, and at least one of the extension rods 2422 of the second conductive elastic element 242 abuts on an inner side wall of the annular portion 2411 of the conductive ring 241. The second conductive elastic element 242 (i.e., the torsion spring) can provide a torsion force when the second shaft rod 222 is rotated. It is worth mentioning that, in the present embodiment, the at least one of the extension rods 2422 of the second conductive elastic element 242 exemplarily abuts against the inner side wall of the annular portion 2411 of the conductive ring 241, but the present disclosure is not limited thereto. The at least one of the extension rods 2422 of the second conductive elastic element 242 can also, for example, abut against a bottom edge of the annular portion 2411 of the conductive ring 241 (as shown in FIG. 17) and move along the annular path. In another embodiment of the present disclosure, a second conductive elastic element 242' can be, for example, a conductive elastic sheet (as shown in FIG. 18). Alternatively, a second conductive elastic element 242" can be an elastic arm (as shown in FIG. 19). As long as the structural design of the second conductive elastic element 242 can enable the one end or at least the one part of the second conductive elastic element 242 to be sleeved or connected to the second shaft rod 222, and another end of the second conductive elastic element 242 can be in contact with the conductive ring 241 and can move along the annular path, the structural design of the second conductive elastic element 242 is within the scope of the present disclosure. It is worth mentioning that, in FIG. 18, a portion of the second conductive elastic element 242' that abuts against the annular portion 2411 has a bent and extended structure (not numbered in the figures). When the second conductive elastic element 242' abuts against the bottom edge of the annular portion 2411, the second conductive elastic element 242' can generate a structural reversal force (or an elastic contact force), so that the second conductive elastic element 242' can continuously abut against the bottom edge of the annular portion 2411 of the conductive ring 241.

More specifically, when the second terminal 221 is folded or unfolded to drive the second shaft rod 222 to be rotated relative to the first rotation axis L1, the second conductive elastic element 242 (i.e., the torsion spring) can provide a torque force to the second shaft rod 222. Furthermore, when the second terminal 221 rotates around the second rotation axis L2 to drive the second conductive terminal member 22 to rotate relative to the second rotation axis L2, the at least one of the extension rods 2422 of the second conductive elastic element 242 can continuously abut against the inner side wall of the annular portion 2411 of the conductive ring 241 and move along the annular path defined by the annular portion 2411. Furthermore, the annular portion 2411 of the conductive ring 241 can interfere with the extension rod 2422.

Accordingly, the second conductive terminal member 22 can be continuously maintained in a state of electrical connection through the connection of the second conductive elastic element 242.

In addition, the extension portion 2412 of the conductive ring 241 is configured to be connected with electronic components (not shown in the figures) disposed inside the cover structure 1.

As shown in FIG. 3 to FIG. 5, the terminal connection member 25 has insulation properties. Further, the terminal connection member 25 has a first connection portion 251, a second connection portion 252, and a shaft connection portion 253 connected between the first connection portion 251 and the second connection portion 252.

The first connection portion 251 covers a first part where the first terminal 211 is connected to the first shaft rod 212. The second connection portion 252 covers a second part where the second terminal 221 is connected to the second shaft rod 222. The shaft connection portion 253 covers the first shaft rod 212 and is configured to connect the first terminal 211 and the second terminal 221. Therefore, the first conductive terminal member 21 and the second conductive terminal member 22 can be connected to each other through the terminal connection member 25, so that the first terminal 211 and the second terminal 221 can be folded, unfolded, or rotated together. In the present embodiment, the first terminal 211 and the second terminal 221 are embedded in the terminal connection member 25 that is injection molded. That is, the first connection portion 251, the second connection portion 252, and the shaft connection portion 253 of the terminal connection member 25 are integrally formed with each other, but the present disclosure is not limited thereto. The first connection portion 251, the second connection portion 252, and the shaft connection portion 253 of the terminal connection member 25 can be, for example, independent structures separate from each other.

In addition, the terminal connection member 25 can be used to maintain electrical insulation between the first conductive terminal member 21 and the second conductive terminal member 22. At least one part of the shaft connection portion 253 is a hollow part. The first conductive elastic element 232 can continuously abut against the first shaft rod 212 of the first conductive terminal member 21 through the hollow part of the shaft connection portion 253, so as to maintain the state of electrical connection.

As shown in FIG. 3 to FIG. 5, the terminal fixing member 26 includes a first fixing body 262 and a second fixing body 262. The first fixing body 261 has a shape of a circular plate, a central part of the first fixing body 261 has a circular through hole 2611 formed therein, and a bottom surface of the first fixing body 261 has a plurality of protruding structures 2612 formed thereon. In addition, the second fixing body 262 is substantially cylinder-shaped, an inner side of the second fixing body 262 has a circular recess 2621 recessed therein, and a bottom of the second fixing body 262 has two terminal extension slits 2622 that are in spatial communication with the circular recess 2621.

When the power input device 100 is in the assembled state, the terminal fixing member 26 is disposed on the cover plate 14 of the cover structure 1 and located in the accommodation space 13 of the cover structure 1. The terminal fixing member 26 can rotate relative to the cover structure 1 around the second rotation axis L2.

More specifically, the first fixing body 261 is disposed on the circular groove 141 of the cover plate 14 of the cover structure 1 and is rotatable relative to the cover structure 1. The conductive sheet 231 of the first electrical connection member 23 is located between the first fixing body 261 and the cover plate 14 and located above the circular through hole 2611 of the first fixing body 261. The annular portion 2411 of the conductive ring 241 of the second electrical connection member 24 is disposed to surround an upper edge of the first fixing body 261.

The circular through hole 2611 of the first fixing body 261 can allow the first conductive elastic element 232 (i.e., the coil spring) to pass therethrough, so that the first conductive elastic element 232 can abut against the first shaft rod 212 of the first conductive terminal member 21. The plurality of protruding structures 2612 of the first fixing body 261 can be engaged with the terminal connection member 25 (i.e., engaged with the shaft connection portion 253), so that the terminal connection member 25 is fixedly disposed on the first fixing body 261 together with the first conductive terminal member 21 and the second conductive terminal member 22, and can rotate with the first fixing body 261.

The second fixing body 262 is configured to be sleeved on an outer side of the first fixing body 261, so that the first fixing body 261, the terminal connection member 25, the first conductive terminal member 21, and the second conductive terminal member 22 (i.e., a plug module) can be arranged in the circular recess 2621 of the second fixing body 262.

Furthermore, the first terminal 211 of the first conductive terminal member 21 and the second terminal 221 of the second conductive terminal member 22 can respectively protrude from the two terminal extension slits 2622 of the second fixing body 262. In addition, the first terminal 211 and the second terminal 221 can be folded and unfolded through the two terminal extension slits 2622, respectively.

In addition, when a user performs a rotating operation on the first terminal 211 and the second terminal 221, both the first fixing body 261 and the second fixing body 262 of the terminal fixing member 26 can synchronously rotate relative to the cover structure 1. It is worth mentioning that, through the design of the plug structure 2 of the present disclosure, the first terminal 211 and the second terminal 221 can maintain the state of electrical connection when any of folding, unfolding, and the rotating operations is performed.

Referring to FIG. 10 to FIG. 15, one embodiment of the present disclosure provides a power module that includes the above-described power input device 100 and an adapter plug 200. The adapter plug 200 can be, for example, an adapter plug having specifications of other countries. The power input device 100 can be connected to the adapter plug 200, so that the conductive terminals of the power input device 100 that are in a folded, unfolded, or rotated state can allow a commercial power to be transmitted to a power conversion device through this structure.

The adapter plug 200 includes an adapter base 201 and a plurality of adapter terminals 202 disposed on one side surface (e.g., a bottom surface) of the adapter base 201. Another side surface (e.g., a top surface) of the adapter base 201 has an adapter structure 203, an inner side of the adapter structure 203 has an adapter space 204 formed thereon, the adapter structure 203 includes two adapter elastic sheets 205 inside the adapter space 204, and one end of each of the adapter elastic sheets 205 has a fixing bump 206 formed thereon.

When the power input device 100 is connected to the adapter plug 200, the first terminal 211 and the second terminal 221 of the power input device 100 can extend into the adapter space 204 of the adapter structure 203, the first terminal 211 and the second terminal 221 can be respectively in contact with the two adapter elastic sheets 205 so as to be electrically connected with the two adapter elastic sheets 205, and the fixing bumps 206 of the two adapter elastic sheets 205 can be respectively engaged with the first through hole 213 of the first terminal 211 and the second through hole 223 of the second terminal 221 so as to produce an engaging effect.

Beneficial Effects of the Embodiments

In conclusion, the power input device 100 of the embodiments of the present disclosure includes the plug that has folding and turning functions. The conductive terminals of the plug (i.e., the first terminal 211 and the second terminal 221) can be rotated by 360 degrees. The conductive terminals of the power input device 100 of the embodiment of the present disclosure can be used as connection terminals to connect with the adapter plug 200 (i.e., an adapter plug from other country).

To achieve the abovementioned purpose, the conductive terminals of the power input device 100 according to the embodiment of the present disclosure must have the function of conducting electricity at any time, so that the conductive terminals in any state can allow the commercial power to be transmitted to the power input device 100 through the plug structure of the pre sent disclosure.

The plug structure 2 of the power input device 100 of the embodiment of the present disclosure can conduct the power obtained from the commercial power to the conductive sheet 231 and the conductive ring 241 through the first and second conductive elastic elements 232 and 242, respectively.

The length direction of the first conductive elastic element 232 is disposed along the second rotation axis L2. That is, the coil spring passes through a rotation center of the plug structure 2.

In practical applications, the power input device 100 according to the embodiment of the present disclosure can be used as a portable low-current power input device, and the terminals 211 and 221 thereof are designed to have the through holes 213 and 223 that are circular.

When the terminals 211 and 221 are used as an electrical connection structure with the plug of other country, the adapter elastic sheets 205 of the adapter plug 200 of other country have the fixing bumps 206 that correspond in shape to the above-mentioned through holes 213 and 223. The fixing bumps 206 can enter into the through holes 213 and 223 of the terminals 211 and 221 to serve as an engaging structure between the power input device 100 and the adapter plug 200, thereby preventing the adapter plug 200 from loosening.

The power input device 100 of the embodiment of the present disclosure can conduct the commercial power to the conductive sheet 231 and the conductive ring 241 through the abovementioned plug structure 2. The power input device 100 can be further connected to a power line through the sheet-like extension portion 2312 of the conductive sheet 231 and the extension portion 2412 of the conductive ring 241, respectively, and can be further connected to a printed circuit board (PCB) that has a power conversion function through the power line.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power input device, comprising:

a cover structure, the cover structure having a bottom that defines an accommodation space; and a plug structure disposed in the accommodation space of the cover structure; wherein conductive terminals of the plug structure are capable of being folded and unfolded along a first rotation axis, and capable of being rotated around a second rotation axis; wherein the plug structure includes:

a first conductive terminal member including a first terminal and a first shaft rod connected to the first terminal;

a second conductive terminal member spaced apart from the first conductive terminal member; wherein the second conductive terminal member includes a second terminal and a second shaft rod connected to the second terminal; wherein the first terminal and the second terminal are the conductive terminals of the plug structure;

a first electrical connection member including a conductive sheet and a first conductive elastic element; wherein one end of the first conductive elastic element is connected to the conductive sheet, and another end of the first conductive elastic element abuts against the first shaft rod; and a second electrical connection member including a conductive ring and a second conductive elastic element; wherein the conductive ring is disposed to surround the conductive sheet, one end or at least one part of the second conductive elastic element is sleeved on or connected to the second shaft rod, and another end of the second conductive elastic element abuts against the conductive ring and is movable along an annular path.

2. The power input device according to claim 1, wherein the second conductive elastic element has a spiral body and two extension rods that respectively extend from two ends of the spiral body; wherein the spiral body of the second conductive elastic element is sleeved on the second shaft rod, and at least one of the extension rods of the second conductive elastic element abuts against the conductive ring and is movable along the annular path; wherein, when the conductive terminals of the plug structure are folded, unfolded, or rotated, the one end of the first conductive elastic element is continuously connected to the conductive sheet, and the another end of the first conductive elastic element continuously abuts against the first shaft rod and provides an elastic contact force to the first shaft rod; wherein the spiral body of the second conductive elastic element provides an elastic force to the second shaft rod, the one end or the at least one part of the second conductive elastic element is continuously sleeved on or connected to the second shaft rod, and the at least one of the extension rods of the second conductive elastic element is capable of continuously abutting against an inner side wall of the conductive ring and moving along the annular path.

3. The power input device according to claim 1, wherein a central axis of the first shaft rod and a central axis of the second shaft rod are both arranged along the first rotation axis; wherein, when the first terminal and the second terminal are folded or unfolded, the first shaft rod and the second shaft rod both rotate around the first rotation axis; wherein a length direction of the first conductive elastic element extends along the second rotation axis.

4. The power input device according to claim 1, wherein an inside of the cover structure includes a cover plate, the cover plate is located above the accommodation space, the conductive sheet of the first electrical connection member is fixedly disposed on the cover plate, and the conductive ring of the second electrical connection member is fixedly disposed on the cover plate.

5. The power input device according to claim 4, further comprising a terminal connection member; wherein the terminal connection member has a first connection portion, a second connection portion, and a shaft connection portion connected between the first connection portion and the second connection portion; wherein the first connection portion covers a first part where the first terminal is connected to the first shaft rod, the second connection portion covers a second part where the second terminal is connected to the second shaft rod, and the shaft connection portion covers the first shaft rod and is configured to connect the first terminal and the second terminal to enable the first terminal and the second terminal to be folded, unfolded, or rotated together.

6. The power input device according to claim 5, wherein at least one part of the shaft connection portion is a hollow part, so that the first conductive elastic element is able to continuously abut against the first shaft rod of the first conductive terminal member through the hollow part of the shaft connection portion.

7. The power input device according to claim 5, further comprising a terminal fixing member; wherein the terminal fixing member is disposed on the cover structure and located in the accommodation space of the cover structure, and the terminal fixing member is rotatable relative to the cover structure around the second rotation axis.

8. The power input device according to claim 7, wherein the terminal fixing member includes a first fixing body and a second fixing body, the first fixing body has a shape of a circular plate, a central part of the first fixing body has a circular through hole formed therein, and a bottom surface of the first fixing body has a plurality of protruding structures formed thereon; wherein the second fixing body is substantially cylinder-shaped, an inner side of the second fixing body has a circular recess recessed therein, and a bottom of the second fixing body has two terminal extension slits that are in spatial communication with the circular recess.

9. The power input device according to claim 8, wherein the first fixing body is disposed on the cover plate, and the conductive sheet is located between the first fixing body and the cover plate, and is located above the circular through hole of the first fixing body; wherein the circular through hole allows the first conductive elastic element to pass therethrough, and the plurality of protruding structures of the first fixing body are used for engaging onto the terminal connection member; wherein the second fixing body is sleeved on an outer side of the first fixing body, so that the first fixing body, the terminal connection member, the first conductive terminal member, and the second conductive terminal member are co-located in the circular recess of the second fixing body; wherein the first terminal and the second terminal are able to respectively protrude from the two terminal extension slits of the second fixing body so as to be folded or unfolded.

10. A power module, comprising:

the power input device as claimed in claim 1; wherein one end of the first terminal away from the first shaft rod has a first through hole, and one end of the second terminal away from the second shaft rod has a second through hole; and an adapter plug including an adapter base and a plurality of adapter terminals disposed on one side surface of the adapter base; wherein another side surface of the adapter base has an adapter structure, an inner side of the adapter structure has an adapter space, the adapter structure includes two adapter elastic sheets inside the adapter space, and one end of each of the adapter elastic sheets has a fixing bump;

wherein the power input device is capable of being connected to the adapter plug, the first terminal and the second terminal of the power input device are able to extend into the adapter space of the adapter structure, the first terminal and the second terminal are able to be respectively in contact with the two adapter elastic sheets, and the fixing bumps of the two adapter elastic sheets are capable of being engaged with the first through hole of the first terminal and the second through hole of the second terminal, respectively.

11. A power input device, comprising:

a cover structure, a bottom of the cover structure having an accommodation space; and a plug structure disposed in the accommodation space of the cover structure; wherein conductive terminals of the plug structure are capable of being folded and unfolded along a first rotation axis; wherein the plug structure includes:

a first conductive terminal member including a first terminal and a first shaft rod connected to the first terminal;

a second conductive terminal member spaced apart from the first conductive terminal member; wherein the second conductive terminal member includes a second terminal and a second shaft rod connected to the second terminal; wherein the first terminal and the second terminal are the conductive terminals of the plug structure; and a first electrical connection member including a conductive sheet and a first conductive elastic element; wherein one end of the first conductive elastic element is connected to the conductive sheet, and another end of the first conductive elastic element abuts against a portion of the first shaft rod located between the first terminal and the second terminal;

wherein a central axis of the first shaft rod and a central axis of the second shaft rod are both arranged along the first rotation axis; wherein, when the first terminal and the second terminal are folded or unfolded, the first shaft rod and the second shaft rod both rotate around the first rotation axis.

12. The power input device according to claim 11, further comprising a terminal connection member; wherein the terminal connection member is disposed in the accommodation space of the cover structure, and is configured to connect the first conductive terminal member and the second conductive terminal member, so as to drive the first terminal and the second terminal to be folded or unfolded together.

13. The power input device according to claim 11, wherein one end of the first terminal away from the first shaft rod has a first through hole, and one end of the second terminal away from the second shaft rod has a second through hole; wherein the first through hole and the second through hole are capable of being engaged with fixing bumps of two adapter elastic sheets of an adapter plug, respectively.

* * * * *